(12) United States Patent
Seko et al.

(10) Patent No.: US 7,562,821 B2
(45) Date of Patent: Jul. 21, 2009

(54) POSITION MEASUREMENT SYSTEM

(75) Inventors: Yasuji Seko, Kanagawa (JP); Tsutomu Abe, Kanagawa (JP); Yoshinori Yamaguchi, Kanagawa (JP); Hiroyuki Miyake, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 740 days.

(21) Appl. No.: 11/353,011

(22) Filed: Feb. 14, 2006

(65) Prior Publication Data

US 2007/0045420 A1 Mar. 1, 2007

(30) Foreign Application Priority Data

Aug. 23, 2005 (JP) ............................. 2005-241638

(51) Int. Cl.
*G06K 7/10* (2006.01)
(52) U.S. Cl. ...................................... 235/454; 235/435
(58) Field of Classification Search ................. 235/435, 235/454; 250/559.32; 356/498
See application file for complete search history.

(56) References Cited

U.S. PATENT DOCUMENTS

| 6,188,058 | B1 * | 2/2001 | Tullis | 250/208.1 |
| 6,259,111 | B1 * | 7/2001 | Tullis | 250/559.32 |
| 7,274,461 | B2 * | 9/2007 | Seko | 356/498 |
| 2005/0259266 | A1 * | 11/2005 | Seko | 356/498 |
| 2006/0118626 | A1 * | 6/2006 | Kricorissian | 235/454 |
| 2007/0133006 | A1 * | 6/2007 | Seko et al. | 356/498 |
| 2007/0291278 | A1 * | 12/2007 | Seko | 356/498 |

FOREIGN PATENT DOCUMENTS

JP A 2004-28977 1/2004

* cited by examiner

*Primary Examiner*—Daniel A Hess
(74) *Attorney, Agent, or Firm*—Oliff & Berridge, PLC

(57) ABSTRACT

A position measurement system, includes: a plurality of concentric pattern projectors each for projecting a concentric pattern; an image sensor that has a sensor plane and that detects the concentric pattern; and an arithmetic unit that calculates a position of the image sensor and a normal direction of the sensor plane from a detection signal of the image sensor.

9 Claims, 5 Drawing Sheets

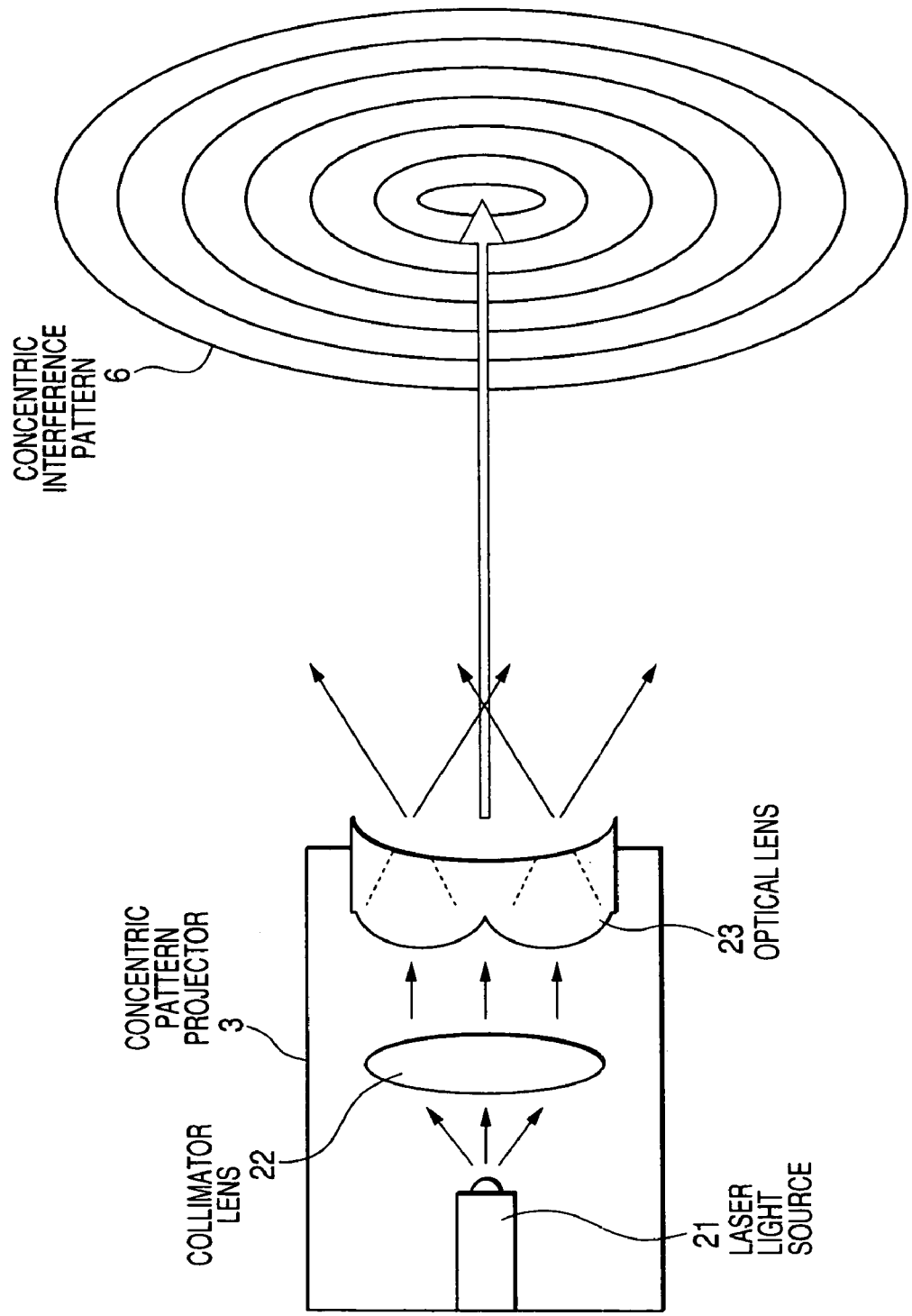

POSITION MEASUREMENT SYSTEM

BACKGROUND OF THE INVENTION

1. Field of the Invention

This invention relates to a position measurement system of projecting a concentric pattern, detecting the concentric pattern by a sensor, and measuring the position of the sensor and the normal direction of the sensor plane. The position measurement system can be used as a sensor installing pointer, a position information system, etc., for example.

2. Description of the Related Art

To measure the position of an object with high accuracy in three-dimensional position measurement, for example, a measurement method using interference of light is used; however, this kind of related art involves the following problems: The cost of the parts of an interference optical system is high; the position accuracy required for assembling is high; the number of parts is large and a number of assembling steps is required; the method (art) is unfitted for position measurement of a mobile unit, etc.

Then, for example, JP-A-2004-28977 proposes a position measurement system capable of executing position measurement using interference of light at a low cost in a simple configuration. The system can be used as a pointer system, for example. In the pointer system, a device for projecting a concentric pattern is used as a pointer and a sensor is installed in the proximity of an object pointed to by the pointer, for example, a display. If the user points to the object by the pointer, the concentric pattern projected by the pointer is detected by the sensor, the center point of the concentric pattern is calculated using an arithmetic unit from the detection information, and a cursor is displayed on the display, for example, with the center point as the point pointed to by the pointer.

In this method, however, only one user can use the system and it is difficult for a plurality of persons to use respective pointers at the same time; this is a problem. To identify the users of a plurality of pointers, it is necessary to carry a modulation signal on light emitted by each pointer and install a function of identifying the light (modulation signal) in the light receiving party; this is also a problem. Thus, the pointer system in the related art is a system used by one user and it is virtually impossible for a plurality of persons to use respective pointers at the same time. The method of assigning ID to each pointer and identifying it is complicated.

SUMMARY OF THE INVENTION

Accordingly, the invention provides a position measurement system of detecting projected concentric patterns by a sensor and measuring the position of the sensor and the normal direction of the sensor plane for enabling a plurality of users to use pointers at the same time.

The invention may provide a position measurement system, including: a plurality of concentric pattern projectors each for projecting a concentric pattern; an image sensor that has a sensor plane and that detects the concentric pattern; and an arithmetic unit that calculates a position of the image sensor and a normal direction of the sensor plane from a detection signal of the image sensor.

The invention may provide a position measurement method, including: projecting concentric patterns respectively from a plurality of concentric pattern projectors; detecting the concentric patterns by an image sensor that has a sensor plane; and calculating a position of the image sensor and a normal direction of the sensor plane from a signal of each detected concentric pattern.

The invention may provide a pointer pointing point display method, including: projecting concentric pattern respectively from a plurality of concentric pattern projectors; detecting the concentric patterns by an image sensor that has a sensor plane and that is installed in a pointer; calculating a position of the image sensor and a normal direction of the sensor plane from a signal of each detected concentric pattern; and displaying a pointing point on the display pointed to by the pointer as a cursor on the display based on the calculation result.

The invention may provide a mobile object tracing method, including: projecting concentric patterns from a plurality of concentric pattern projectors; detecting the concentric patterns by an image sensor installed in a mobile object; calculating a position of the image sensor and a normal direction of the sensor plane from a signal of each detected concentric pattern; and tracing a position and a direction of the mobile object based on the calculation result.

BRIEF DESCRIPTION OF THE DRAWINGS

Embodiment may be described in detail with reference to the accompanying drawings, in which:

FIG. 2 is a drawing to show an example of a concentric pattern projector used with the invention;

DETAILED DESCRIPTION OF THE INVENTION

Figure 1:
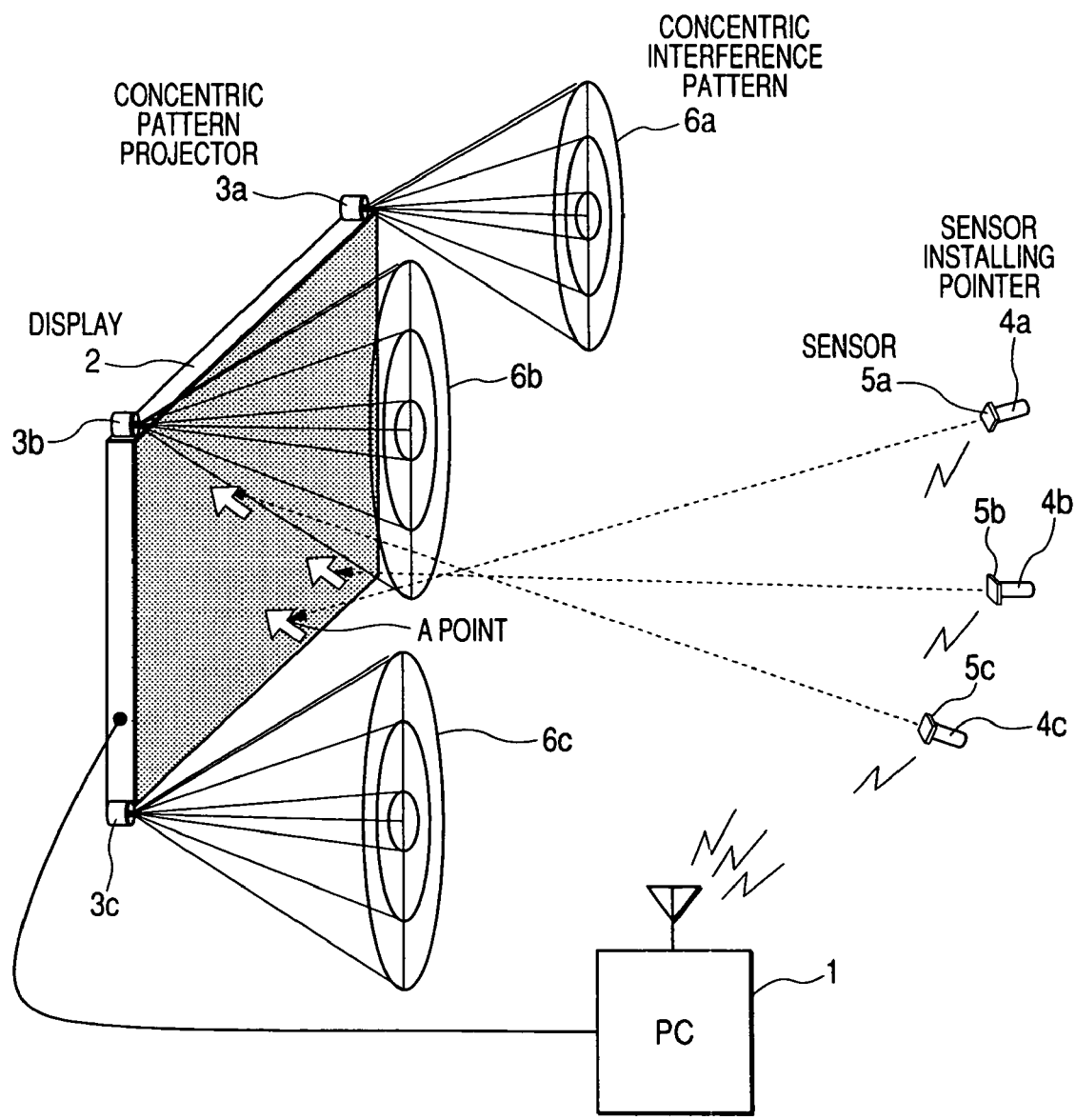
FIG. 1 is a drawing to show one embodiment of a position measurement system according to the invention.

FIG. 1 is a drawing to show one embodiment of a position measurement system according to the invention. The embodiment will be discussed by taking a pointer system as an example as the position measurement system, but the invention is not limited to it.

The system of the embodiment includes a display 2 for displaying an image based on a signal from a computer (PC) 1 such as a personal computer, as shown in FIG. 1. In the proximity of the display 2, three concentric pattern projectors 3a, 3b, and 3c are installed in three corners of the display 2, for example. On the other hand, for example, three users hold sensor installing pointers 4a, 4b, and 4c. The sensor installing pointers 4a, 4b, and 4c include each a transmitter for transmitting a signal to the PC 1 in a wireless (or wired) manner. The PC 1 serves as an arithmetic unit for performing predetermined operations based on the received signal.

The concentric pattern projectors 3a, 3b, and 3c project concentric interference pattern light. The configuration of each concentric pattern projector is described later. The sensor installing pointers 4a, 4b, and 4c install image sensors 5a, 5b, and 5c respectively, for example; the light reception face (a sensor plane 5) of each image sensor is placed in parallel with the perpendicular face in the pointing direction of the corresponding pointer. A small camera of IEEE1394 terminal can be used as the image sensor. The cameras have their respective ID numbers and when the cameras are connected to the PC 1, the ID numbers are identified automatically. Therefore, one PC 1 can easily identify a plurality of pointers and can record the pointing position (pointing point) of the corresponding pointer based on the ID number.

For example, the system operates as follows: Now assume that the display 2 is in a state in which it can display a cursor in the pointing place of the pointer based on the signal from the PC 1 and that the concentric pattern projectors 3a, 3b, and 3c project light of concentric interference patterns 6a, 6b, and 6c toward the direction of the pointers. Now, attention is focused on the sensor installing pointer 4a. Assume that the user holds the sensor installing pointer 4a and points to a specific location of the display 2, for example, A point in the figure. At this time, the image sensor 5a of the sensor installing pointer 4a detects a part of each of the concentric interference patterns 6a, 6b, and 6c projected from the three concentric pattern projectors 3a, 3b, and 3c. The detection signals of the concentric interference patterns 6a, 6b, and 6c detected by the image sensor 5a are transmitted to the PC 1 in a wireless (or wired) manner. The PC 1 calculates the three-dimensional coordinates of the pointer 4a and the direction (the position of the image sensor 5a and the normal direction of the sensor plane) from the received detection signals of the concentric interference patterns 6a, 6b, and 6c. The calculation method is described later. The cursor is displayed at the intersection point (A point) of the extension of the vector and the display 2. The user can move the cursor on the display 2 by moving the pointing point of the sensor installing pointer 4a. At the same time, other users can also display cursors using the sensor installing pointers 4b and 4c in a similar manner.

Accordingly, the system enables a large number of persons to use the pointers at the same time and can easily take the IDs of a large number of pointers and can keep track of motion of the cursor caused by the pointer for each ID. This is accomplished as the PC 1 associates the ID numbers and the displayed cursors with each other. In the example, the arithmetic unit for calculating the three-dimensional coordinates of the pointer 4a and the direction (the position of the image sensor 5a and the normal direction of the sensor plane) from the detection signals of the concentric interference patterns 6a, 6b, and 6c is installed in the PC 1, but the invention is not limited to the mode; for example, the arithmetic unit can also be installed in the sensor installing pointer 4a, 4b, 4c. In this case, the signal of the sensor position and the normal direction of the sensor plane calculated in each pointer is transmitted to the PC 1 in a wireless (or wired) manner together with the ID number of the sensor.

Figure 3A:
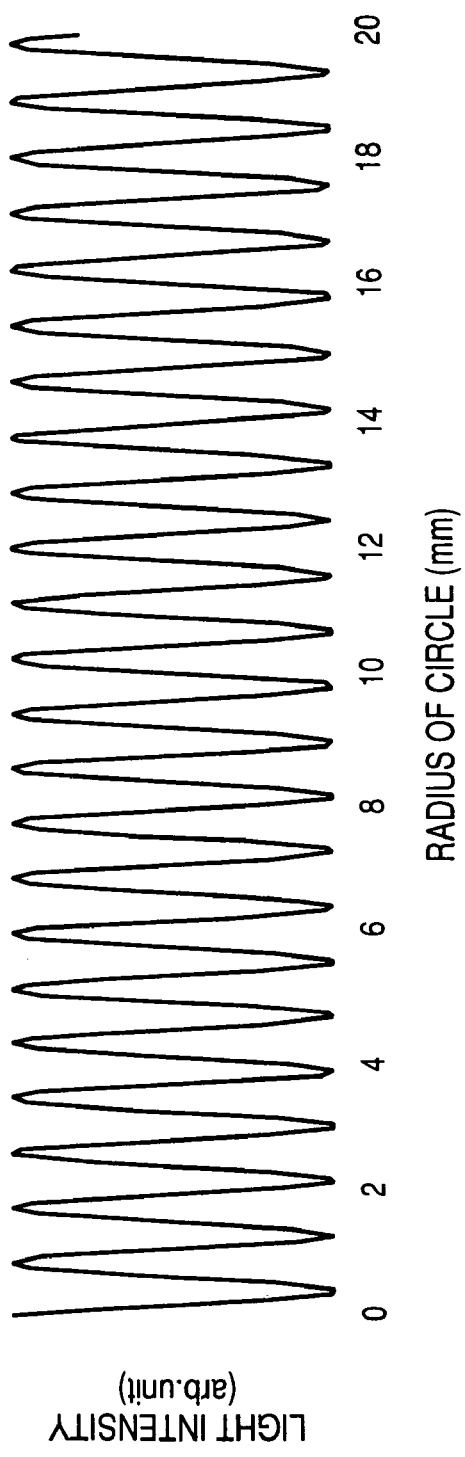
FIGS. 3A and 3B are simulation result drawings to show the pitches of the circle center and the peripheral portion of a concentric interference pattern formed on a projection flat plane.
Figure 3B:
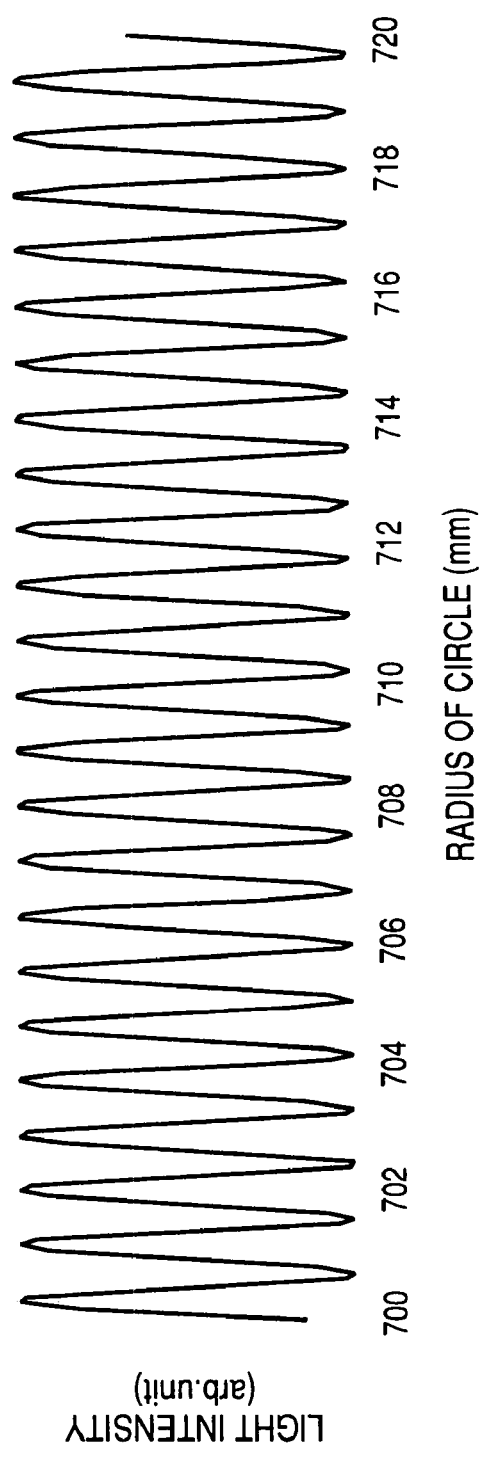

The configuration of each concentric pattern projector and the calculation method of the position of the image sensor and the normal direction of the sensor plane will be discussed below:

FIG. 2 is a drawing to show an example of the concentric pattern projector used with the invention. As shown in the figure, the concentric pattern projector 3 includes a laser light source 21, a collimator lens 22, and an optical lens 23. The optical lens 23 in the example is a ring convex face on the front and a concave face in the rear. The front ring convex face is an aspheric lens having a cross section of $x=0.3*(y-1.5)^{1.55}$ where x is an optical axis and y is an axis perpendicular to the optical axis and in the radius direction of the lens. The rear concave lens is a spherical lens with a curvature radius of −62 mm. The optical lens 23 has a diameter of Φ6 mm, a lens thickness of 3 mm on the optical axis, and a refraction index of 1.51. The wavelength of the laser light source 21 is 850 nm and the light is converted into collimated light through the collimator lens 22 and then the collimated light is allowed to be incident on the optical lens 23 having the front ring convex face and the rear concave face. Accordingly, a concentric interference pattern 6 is projected to the front through the optical lens 23. Assuming that the distance between the lens rear plane to the projection flat plane is 3 m, it was seen from the simulation result that the concentric interference pattern formed on the projection flat plane has 0.816-mm pitches everywhere from the circle center to the outer peripheral part, as shown in FIG. 3A and FIG. 3B. That is, it turned out that if the optical axis of the light source and the flat plane are perpendicular, the pitches of the interference pattern become almost the same everywhere in the flat plane. The simulation result was also able to be acknowledged from the actual experimental result.

Figure 4:
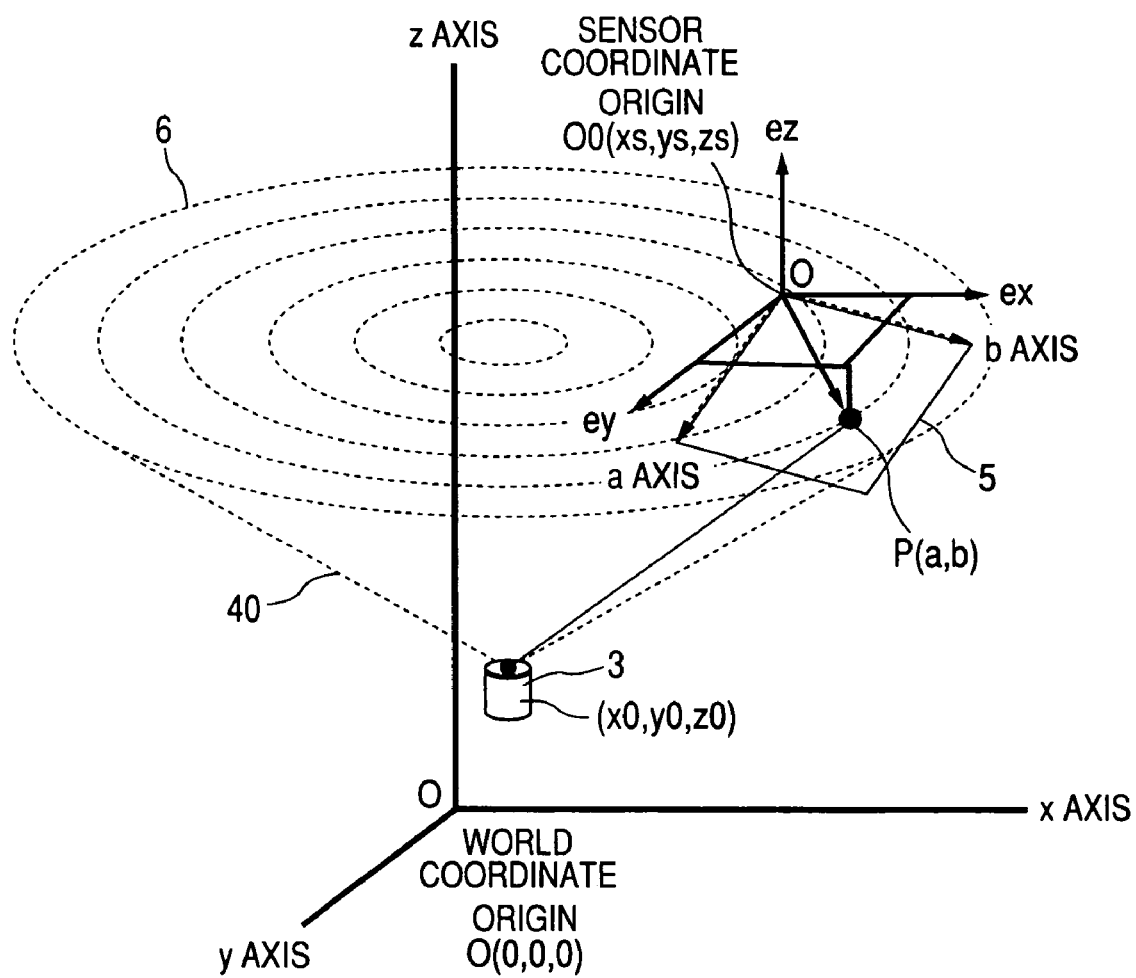
FIG. 4 is a drawing to describe an example of a calculation method of the position of an image sensor and the normal direction of the sensor plane.
Figure 5:
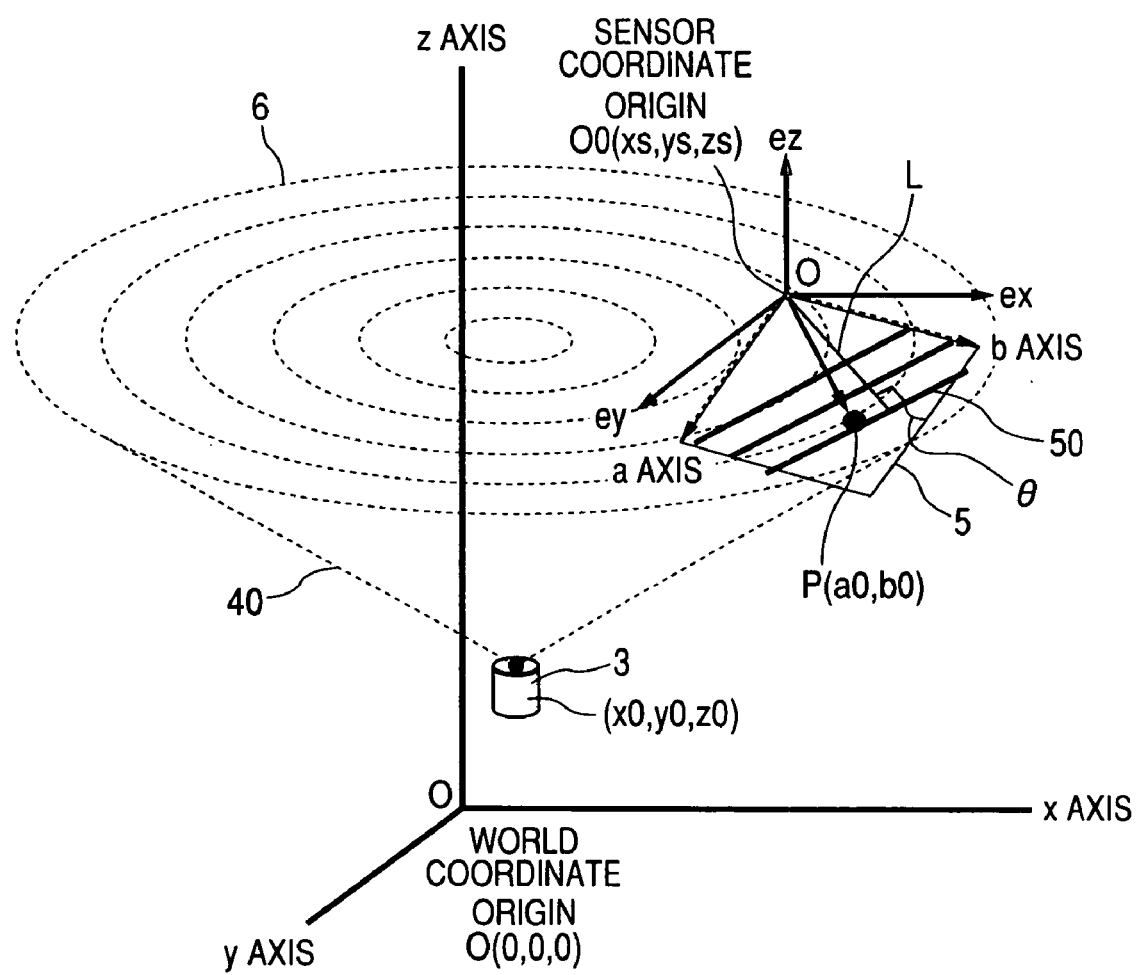
FIG. 5 is a drawing to describe an example of a calculation method of the position of an image sensor and the normal direction of the sensor plane.

FIGS. 4 and 5 are drawings to describe an example of the calculation method of the position of the image sensor and the normal direction of the sensor plane. First, the relationship between world coordinates (x, y, z) and the sensor plane coordinates (a, b) is found. The unit vectors of the x axis, the y axis, the z axis, the a axis, and the b axis are ex, ey, ez, ea, and eb as shown in the figures. At this time, $ex=(1, 0, 0), ey=(0, 1, 0), ez=(0, 0, 1)$ $ea=(a1, a2, a3), eb=(b1, b2, b3), a1^2+a2^2+a3^2=1, b1^2+b2^2+b3^2=1.$ Since the a axis and the b axis are orthogonal to each other, $a1b1+a2b2+a3b3=0$.

Therefore, the number of independent variables becomes three in a1, a2, a3, b1, b2, b3.

Letting the coordinates of point P represented by the a axis and the b axis on the sensor plane be (a, b), the vector OP becomes $OP=a*ea+b*eb=a(a1, a2, a3)+b (b1, b2, b3)=(aa1+bb1, aa2+bb2, aa3+bb3).$ Therefore, the point P (x, y, z) in the world coordinate system becomes as follows:

$x=xs+aa1+bb1$      Expression (1)

$y=ys+aa2+bb2$      Expression (2)

$z=zs+aa3+bb3$      Expression (3)

As shown in FIG. 4, the concentric interference pattern 6 projected with the concentric pattern projector 3 as the vertex forms a cone 40. The cone 40 is represented by $(x-x0)^2+(y-y0)^2=r^2(z-z0)^2$      Expression (4)

where r=r0n where r0 and n are the pitch and the number of the concentric pattern. When expressions (1) to (3) are assigned to expression (4), $(xs+aa1+bb1-x0)^2+(ys+aa2+bb2-y0)^2=r^2 (zs+aa3+bb3-z0)^2$      Expression (5)

This expression is arranged to $Aa^2+Bb^2+Cab+Da+Eb+F=0$      Expression (6)

$A=a1^2+a2^2-r^2a3^2$ $B=b1^2+b2^2-r^2b3^2$ $C=2 (a1b1+a2b2-r^2a3b3)$ $D=2 (a1 (xs-x0)+a2 (ys-y0)-r^2a3 (zs-z0))$ $E=2 (b1 (xs-x0)+b2 (ys-y0)-r^2b3 (zs-z0))$ $F=(xs-x0)^2+(yS-y0)^2-r^2(zs-z0)^2$

As shown in FIG. 5, a part of an ellipse 50 is projected onto the sensor plane by the concentric interference pattern 6 projected from the concentric pattern projector 3. The ellipse 50 is represented by $$Aa^2+Bb^2+Cab+Da+Eb+F=0 \quad \text{Expression (11)}$$

The tangent of the ellipse is found. Assuming that point P (a0, b0) is on the ellipse, $$Aa0^2+Bb0^2+Ca0b0+Da0+Eb0+F=0 \quad \text{Expression (12)}$$

Point Q (a, b) on the line passing through the point P is represented by the following expression:

$$a=a0+tf \quad \text{Expression (13a)}$$

$$b=b0+tg \quad \text{Expression (13b)}$$

where t is the length of line segment PQ.

Assuming that the point Q is also on the ellipse, $$A\,(a0+tf)^2+B\,(b0+tg)^2+C\,(a0+tf)\,(b0+tg)+D\,(a0+tf)+E\,(b0+tg)+F=0 \quad \text{Expression (14)}$$

From expressions (12) and (14), $$t^2\,(Af^2+Bg^2+Cfg)+t\,(2Aa0f+2Bb0g+Ca0f+Cb0g+Df+Eg)=0 \quad \text{Expression (15)}$$

The condition under which the line segment PQ becomes the tangent of the ellipse is that t=0 becomes equal root and therefore $$2Aa0f+2Bb0g+Ca0f+Cb0g+Df+Eg=0$$

$$(2Aa0+Cb0+D)\,f+(2Bb0+Ca0+E)\,g=0 \quad \text{Expression (16)}$$

According to expression (13a)×(2Aa0+Cb0+D)+expression (13b)×(2Bb0+Ca0+E), $$2Aa0a+Cb0a+Da+2Bb0b+Ca0b+Fb=2Aa0^2+2Ca0b0+2Bb0^2+Da0+Eb0.$$

When expression (12) is assigned to the expression, the line tangent to the ellipse at the point P (a0, b0) is found as follows:

$$Aa0a+Bb0b+C/2\,(b0a+a0b)+D/2\,(a+a0)+E/2\,(b+b0)+F=0$$

$$(Aa0+Cb0/2+D/2)\,a+(Bb0+Ca0/2+E/2)\,b+(Da0/2+Eb0/2+F)=0 \quad \text{Expression (17)}$$

Next, considering that the point P (a0, b0) on the ellipse passes through the sensor origin (0, 0), (a0, b0)=(0, 0) and from expression (6), $$F=0\therefore(xs-x0)^2+(ys-y0)^2-r^2(zs-z0)^2=0 \quad \text{Expression (18)}$$

Therefore, $$r^2=((xs-x0)^2+(ys-y0)^2)/(zs-z0)^2 \quad \text{Expression (19)}$$

$$\text{From } r=r0*n \quad \text{Expression (20)}$$

n can be calculated and it turns out that the how-manieth concentric circle the concentric circle passing through the sensor origin is.

Letting the length of the perpendicular to the tangent from the origin be L and the inclination of the perpendicular be θ, $$\theta=a\tan(D/E) \quad \text{Expression (21)}$$

Letting a point on the perpendicular at a distance 1 form the origin be (ax, bx), $$ax=\cos\theta,\ bx=\sin\theta \quad \text{Expression (22)}$$

Next, the how-manieth concentric circle this point is, is found. From expression (6), $$Aax^2+Bbx^2+Caxbx+Dax+Ebx+F=0 \quad \text{Expression (23)}$$

Thus, r is found and $$nx=r/r0 \quad \text{Expression (24)}$$

is obtained. From expressions (20) and (24), $$\Delta n=n-nx \quad \text{Expression (25)}$$

is obtained. Thus, concentric interference pattern spacing ΔL corresponds to n=1 and thus is represented as $$\Delta L=1/\Delta n \quad \text{Expression (26)}$$

Thus, θ obtained according to expression (21) is the normal direction of the concentric interference pattern detected by the sensor, and the interference pattern spacing obtained according to expression (26) is the interference pattern spacing detected by the sensor. In other words, two equations can be set up as for the concentric pattern based on the normal direction and the spacing of the concentric pattern detected by the sensor. Unknowns are the three-dimensional coordinates (xs, ys, zs) of the sensor and three variables in the directions (six unknowns in total). Therefore, the concentric pattern projectors are installed in three locations for projecting concentric interference patterns, whereby the six unknowns can be calculated. In the actual calculation, the three-dimensional coordinates (xs, ys, zs) of the sensor for providing the normal direction and the spacing of the interference pattern picked up by the sensor and the three variables in the directions are calculated by numerical calculation. That is, the six variables are changed in succession and variables providing any desired normal direction and spacing are derived. Accordingly, what place the sensor installing pointer (normal direction of sensor plane) points to can be calculated, and a plurality of persons can use the pointers at the same time.

The described method can be applied in a similar manner regardless of the number of the pointers and the number of used pointers can be increased to any desired number. A plurality of users can also use the pointer system to write a marking, etc., to a display at the same time. Further, the system can be applied not only to the example described above, but also to tracing of a mobile object. In this case, an image sensor is installed in the mobile object. A plurality of concentric pattern projectors project concentric patterns, the image sensor installed in the mobile object detects the concentric patterns, the position of the image sensor and the normal direction of the sensor plane are calculated from the signals of the detected concentric patterns, and the position and the direction of the mobile object are traced based on the calculation result. Accordingly, for example, a person wears the image sensor as described above on his or her chest, etc., whereby information as to who exists at what position and is directed in which direction or the like can be collected.

The invention relates to the position measurement system of projecting a concentric pattern, detecting the concentric pattern by a sensor, and measuring the position of the sensor and the normal direction of the sensor plane, and involves industrial applicability.

According to the invention, there may be provided a position measurement system of detecting projected concentric patterns by a sensor and measuring the position of the sensor and the normal direction of the sensor plane. Therefore, for example, a plurality of concentric pattern projectors are installed on a display and the sensor is installed in a pointer, whereby a plurality of persons can use their respective pointers at the same time. Since ID can be simply given to the sensor of each pointer, so that the pointer can be easily identified and the position and the direction of the pointer can be measured.

The entire disclosure of Japanese Patent Application No. 2005-241638 filed on Aug. 23, 2005 including specification, claims, drawings and abstract is incorporated herein by reference in its entirety.

What is claimed is:

1. A position measurement system, comprising:
   a plurality of concentric pattern projectors each for projecting a concentric pattern;
   an image sensor that has a sensor plane and that detects the concentric pattern; and
   an arithmetic unit that calculates a position of the image sensor and a normal direction of the sensor plane from a detection signal of the image sensor.

2. The position measurement system as claimed in claim 1, further comprising: a pointer in which the image sensor is installed so that the normal direction of the sensor plane corresponds to a pointing direction of the pointer.

3. The position measurement system as claimed in claim 2, further comprising: a computer to which the detection signal is transmitted; and
   a display that is connected to the computer;
   wherein the computer displays on the display a cursor at a pointing point on the display pointed to by the pointer.

4. The position measurement system as claimed in claim 3, wherein the pointer includes a plurality of the pointers in which the image sensors are respectively installed;
   each of the image sensors has an ID number; and
   the ID number is associated with the cursor by the computer.

5. The position measurement system as claimed in claim 3, wherein a position of the cursor on the display is used as a pen point of handwriting entry.

6. The position measurement system as claimed in claim 1, wherein the image sensor is installed in a mobile object; and
   a position and a direction of the mobile object are traced based on the calculated position of the image sensor and the calculated normal direction of the sensor plane.

7. A position measurement method, comprising:
   projecting concentric patterns respectively from a plurality of concentric pattern projectors;
   detecting the concentric patterns by an image sensor that has a sensor plane; and
   calculating a position of the image sensor and a normal direction of the sensor plane from a signal of each detected concentric pattern.

8. A pointer pointing point display method, comprising:
   projecting concentric pattern respectively from a plurality of concentric pattern projectors;
   detecting the concentric patterns by an image sensor that has a sensor plane and that is installed in a pointer;
   calculating a position of the image sensor and a normal direction of the sensor plane from a signal of each detected concentric pattern; and
   displaying a pointing point on the display pointed to by the pointer as a cursor on the display based on the calculation result.

9. A mobile object tracing method, comprising:
   projecting concentric patterns from a plurality of concentric pattern projectors;
   detecting the concentric patterns by an image sensor installed in a mobile object;
   calculating a position of the image sensor and a normal direction of the sensor plane from a signal of each detected concentric pattern; and
   tracing a position and a direction of the mobile object based on the calculation result.

* * * * *